US012627190B2

(12) United States Patent
Li et al.

(10) Patent No.: US 12,627,190 B2
(45) Date of Patent: May 12, 2026

(54) STATOR ASSEMBLY FOR USE IN MOTOR AND ASSEMBLY METHOD THEREFOR, AND MOTOR

(71) Applicant: Schaeffler Technologies AG & Co. KG, Herzogenaurach (DE)

(72) Inventors: Zhihao Li, Shanghai (CN); Jie Liang, Shanghai (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 267 days.

(21) Appl. No.: 18/555,092

(22) PCT Filed: Apr. 12, 2021

(86) PCT No.: PCT/CN2021/086586
§ 371 (c)(1),
(2) Date: Oct. 12, 2023

(87) PCT Pub. No.: WO2022/217424
PCT Pub. Date: Oct. 20, 2022

(65) Prior Publication Data
US 2024/0128823 A1 Apr. 18, 2024

(51) Int. Cl.
*H02K 3/34* (2006.01)
*H02K 15/10* (2006.01)
(52) U.S. Cl.
CPC ............. *H02K 3/345* (2013.01); *H02K 15/10* (2013.01)
(58) Field of Classification Search
CPC ........... H02K 3/34; H02K 3/345; H02K 15/10
(Continued)

(56) References Cited

U.S. PATENT DOCUMENTS

| 2002/0130582 | A1* | 9/2002 | Oketani | ................. | H02K 3/345 |
| | | | | | 310/216.004 |
| 2005/0146238 | A1* | 7/2005 | Morikaku | ................ | H02K 3/30 |
| | | | | | 310/215 |

(Continued)

FOREIGN PATENT DOCUMENTS

| CN | 109075624 A | 12/2018 |
| CN | 111181265 A | 5/2020 |

(Continued)

*Primary Examiner* — Rashad H Johnson
(74) *Attorney, Agent, or Firm* — Volpe Koenig

(57) ABSTRACT

The present invention provides a stator assembly for use in a motor and an assembly method therefor. The stator assembly comprises an iron core (1), comprising a cylindrical iron core body and a plurality of iron core teeth (11), conductor slots (1*h*) for accommodating conductors (3) being formed between every two iron core teeth (11) adjacent in the circumferential direction, side walls of each conductor slot (1*h*) formed by the iron core teeth (11) each comprising a flared portion (111), and the flared portions (111) being opposite each other in the circumferential direction and gradually getting further away from each other as the two extend towards radial openings of the conductor slots (1*h*), and sheet-like insulators (2), accommodated in the conductor slots (1*h*) in a manner of attaching to the peripheral walls of the conductor slots (1*h*), the ends of the sheet-like insulators (2) being disposed at the flared portions (111). As such, undesired interference between the conductors and the sheet-like insulators does not occur during the insertion of the conductors into the conductor slots. The present invention also provides a motor comprising the stator assembly for use in a motor, which can produce the same beneficial effect.

15 Claims, 6 Drawing Sheets

(58) Field of Classification Search
USPC ......................................................... 310/215
See application file for complete search history.

(56) References Cited

U.S. PATENT DOCUMENTS

| | | | | |
|---|---|---|---|---|
| 2009/0026868 A1* | 1/2009 | Morgante | ............... | H02K 17/20 |
| | | | | 903/906 |
| 2011/0012475 A1* | 1/2011 | Mera | ...................... | H02K 3/345 |
| | | | | 310/215 |
| 2011/0260572 A1* | 10/2011 | Hiraga | ................. | H02K 15/068 |
| | | | | 310/215 |
| 2016/0218571 A1 | 7/2016 | Kusase | | |
| 2018/0358858 A1* | 12/2018 | Tsuiki | .................. | H02K 15/022 |
| 2019/0280573 A1* | 9/2019 | Kim | ...................... | H02K 15/085 |
| 2021/0036569 A1* | 2/2021 | Koga | ........................ | H02K 3/12 |
| 2021/0057953 A1* | 2/2021 | Samanta | ................ | H02K 1/165 |
| 2021/0167657 A1* | 6/2021 | Koga | ........................ | H02K 3/50 |
| 2021/0273514 A1* | 9/2021 | Koga | ................... | H02K 15/105 |

FOREIGN PATENT DOCUMENTS

| | | |
|---|---|---|
| CN | 111699612 A | 9/2020 |
| FR | 3100942 A1 | 3/2021 |
| JP | 2013009471 A | 1/2013 |
| JP | 5174485 B2 | 4/2013 |

* cited by examiner

STATOR ASSEMBLY FOR USE IN MOTOR AND ASSEMBLY METHOD THEREFOR, AND MOTOR

CROSS-REFERENCE TO RELATED APPLICATIONS

This application is the U.S. National Phase of PCT Appln. No. PCT/CN2021/086586, filed Apr. 12, 2021, the entire disclosure of which is incorporated by reference herein.

TECHNICAL FIELD

The present disclosure relates to the field of motors, and in particular to a stator assembly for use in a motor and an assembly method therefor, and a motor comprising the stator assembly.

BACKGROUND

Motors are one of the conventional power sources and have a wide range of uses, not only for large industrial equipment, but also for vehicles, etc. In a stator assembly for use in a motor, generally, insulating paper attaching to a peripheral wall of a conductor slot is pre-disposed in the conductor slot of an iron core, and then the conductor (such as a wave winding) is inserted into the conductor slot via a radial opening of the conductor slot. The insulating paper is used to protect the conductor from being damaged during insertion of the conductor, and can also provide insulation protection between the conductor and the iron core after the conductor is inserted into the conductor slot.

Referring to FIGS. 1A and 1B, in an existing stator assembly for use in a motor, the iron core 10 of the stator assembly is formed with a plurality of conductor slots 10*h* that open towards a radially inner side, and the insulating paper 20 is installed in each conductor slot 10*h* in a manner of attaching to the peripheral wall of each conductor slot 10*h* such that the conductor 30 is inserted into the conductor slot 10*h* through the radial opening of the conductor slot 10*h* from the radially inner side (as shown by arrows in FIGS. 1A and 1B).

In the stator assembly, the conductor slot 10*h* is a straight slot, and it can be clearly seen from the cross section of the iron core 10 that the conductor slot 10*h* is presented as a rectangle. This design, brings about the following problems: the insulating paper 20 may not fit particularly well with the conductor slot 10*h* if the insulating paper is not bonded to the peripheral wall of the conductor slot 10*h*, and the conductor 30 may interfere with an end of the insulating paper 20 and cause the end of the insulating paper 20 to curl during insertion of the conductor 30 into the conductor slot 10*h*. As shown in FIG. 1B, when such curling is serious, the end of the insulating paper 20 may be greatly bent, so that the insulating paper 20 blocks insertion of the conductor into the conductor slot 10*h*, thereby exerting adverse effects on the assembly process and on insulation performance between the iron core 10 and the conductor 30 after assembly.

SUMMARY

The present disclosure has been made in order to overcome deficiencies of the prior art as described above. An object of the present disclosure is to provide a novel stator assembly for use in a motor and an assembly method therefor, which can avoid the problem of mutual interference between insulating paper and the conductor in the process of inserting the conductor into the conductor slot to a greater extent than the stator assembly for use in a motor described in the background art above, thereby eliminating adverse effects on assembly and insulation performance of the stator assembly caused by interference. Another object of the present disclosure is to provide a motor comprising the above stator assembly for use in a motor.

To achieve the above objects, the following technical solutions are adopted.

The present disclosure provides a stator assembly for a motor, comprising an iron core, wherein the iron core comprises a cylindrical iron core body and a plurality of iron core teeth, the plurality of iron core teeth protruding from the iron core body along a radial direction of the iron core body and being arranged along a circumferential direction of the iron core body, conductor slots for accommodating conductors being formed between every two iron core teeth adjacent in the circumferential direction, side walls of the conductor slots formed by the iron core teeth comprising flared portions, and the flared portions being opposite each other in the circumferential direction and gradually getting further away from each other as the two extend towards radial openings of the conductor slots; and sheet-like insulators, wherein the sheet-like insulators are accommodated in the conductor slots in a manner of attaching to peripheral walls of the conductor slots, and ends of the sheet-like insulators are disposed at the flared portions.

Preferably, in a cross section orthogonal to a central axis of the iron core body taken along the radial direction, a contour line of the flared portion extends linearly or curvilinearly.

More preferably, the side walls also comprise equidistant portions adjacent to the flared portions, the equidistant portions being opposite to each other in the circumferential direction, and a spacing in the circumferential direction between the equidistant portions being always equal in the radial direction.

More preferably, in the cross section orthogonal to the central axis of the iron core body taken along the radial direction, an angle of an obtuse angle formed by the contour line of the flared portion and a contour line of the equidistant portion is not less than 150 degrees.

More preferably, there is a non-smooth transition or a smooth transition between the flared portion and the equidistant portion, and the sheet-like insulator forms a curved shape at a junction between the flared portion and the equidistant portion.

More preferably, an end of the iron core tooth at the radial opening of the conductor slot has a slot wedge portion protruding towards the inside of the conductor slot, and the slot wedge portion is adjacent to the flared portion.

More preferably, the end of the sheet-like insulator extends to a face of the slot wedge portion adjacent to the flared portion.

More preferably, the stator assembly for use in a motor comprises conductors, and a plurality of conductors are respectively accommodated and installed in each conductor slot formed by the iron core.

More preferably, the conductor is a wave winding.

The present disclosure also provides an assembly method for the stator assembly for use in a motor according to any one of the preceding technical solutions, wherein the assembly method comprises the following steps: putting the sheet-like insulator into the conductor slot, wherein the sheet-like insulator curves at an interface of the flared portion and the equidistant portion of the side wall of the conductor slot, the sheet-like insulator is attached to the peripheral wall of the conductor slot, and an end of the sheet-like insulator is disposed at the flared portion; and inserting the conductor into the conductor slot along the radial direction.

The present disclosure also provides a motor as follows, which comprises the stator assembly for use in a motor according to any one of the preceding technical solutions.

By adopting the above technical solutions, the present disclosure provides the stator assembly for use in a motor and an assembly method therefor, wherein a flared portion is formed at a portion of the side wall of the conductor slot near the radial opening of the conductor slot, and the end of the sheet-like insulator (such as insulating paper) is disposed at the flared portion. As such, during insertion of the conductor into the conductor slot under a state where the conductor is attached to the peripheral wall of the conductor slot, undesired interference between the conductor and the sheet-like insulator does not occur, avoiding adverse effects caused by interference between the conductor and the sheet-like insulator in the assembly process of the stator assembly for use in a motor, while ensuring good insulation performance between the iron core and the conductor. The present disclosure also provides a motor comprising the stator assembly for use in a motor, which can produce the same beneficial effect.

DETAILED DESCRIPTION OF EMBODIMENTS

Figure 1A:
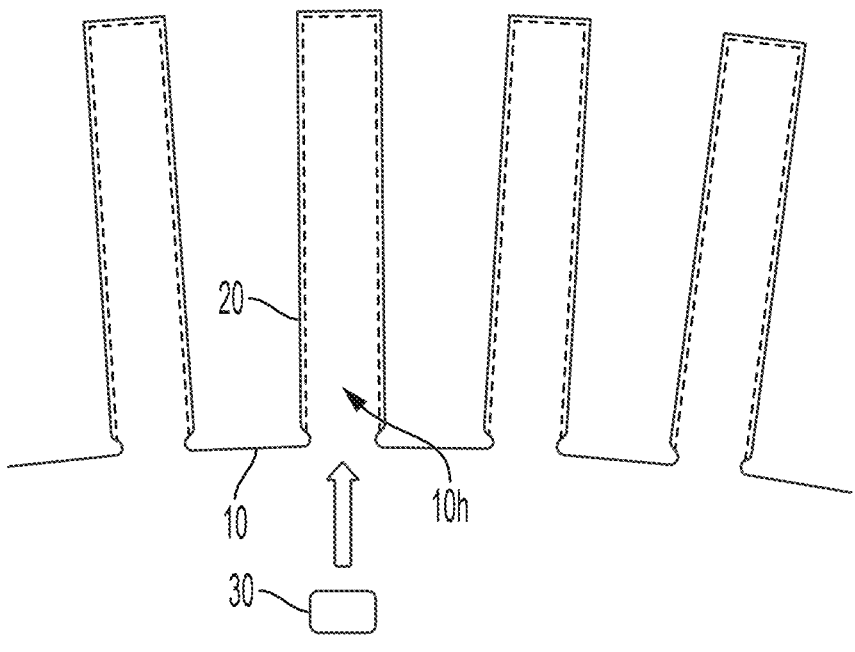
FIG. 1A shows a partial assembly process of a stator assembly for use in a motor, wherein a conductor is prepared to be inserted into a conductor slot of an iron core along a direction of an arrow.
Figure 1B:
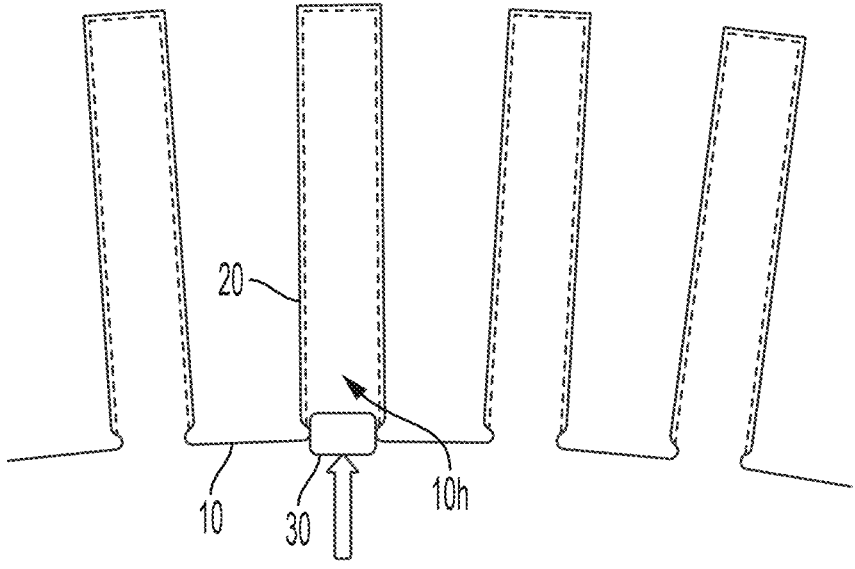
FIG. 1B shows a partial assembly process of the stator assembly for use in a motor in FIG. 1A, wherein the conductor is located at a radial opening of the conductor slot and causes an end of insulating paper to curl.

Exemplary implementations of the present disclosure will be described below with reference to the drawings. It should be noted that, unless indicated otherwise, "axial direction", "radial direction" and "circumferential direction" refer to an axial direction, a radial direction and a circumferential direction of a stator assembly for use in a motor (an iron core body of an iron core), respectively.

A structure of a stator assembly for use in a motor according to an embodiment of the present disclosure will be described with reference to the accompanying drawings of the specification.

(Structure of the Stator Assembly for Use in a Motor)

Referring to FIGS. 2A to 2E, the stator assembly for use in a motor according to an embodiment of the present disclosure comprises an iron core 1, insulating paper 2 and a conductor 3.

Specifically, in the present embodiment, the iron core 1 comprises a cylindrical iron core body and a plurality of iron core teeth 11 which protrude from the iron core body along the radial direction and are arranged along the circumferential direction, and FIGS. 2A to 2E only intercept a partial structure of the iron core 1 including a part of the iron core teeth 11. Conductor slots 1h for accommodating the insulating paper 2 and the conductor 3 are formed between every two adjacent iron core teeth 11, and each conductor slot 1h has a radial opening that opens towards the radially inner side.

A side wall of the conductor slot 1h formed by the iron core teeth 11 includes a flared portion 111 and an equidistant portion 112 adjacent to the flared portion 111 (adjacent to and connected to each other), and the flared portion 111 is located at a portion of the side wall of the conductor slot 1h near the radial opening, and the flared portion 111 is located at the radially inner side of the equidistant portion 112. The flared portions 111 of two opposite side walls of the conductor slot 1h face each other in the circumferential direction, and a spacing of the flared portions 111 in the circumferential direction gradually increases towards the radial opening of the conductor slot 1h. The equidistant portions 112 are opposite to each other in the circumferential direction, and a spacing between the equidistant portions 112 in the circumferential direction is always equal in the radial direction. In this way, since the flared portion 111 is formed at the part of the side wall of the conductor slot 1h near the radial opening, the conductor slot 1h is not a straight slot like the conductor slot 10h in the background art. Furthermore, in the case that an end of the insulating paper 2 is disposed at the flared portion 111, the conductor slot 1h forms a larger space at a position where the end of the insulating paper 2 is disposed, which facilitates insertion of the conductor 3 into the conductor slot 1h, without interference with the end of the insulating paper 2.

In this embodiment, transition between the flared portion 111 and the equidistant portion 112 is not smooth, and the insulating paper 2 forms a bent shape at a junction (a boundary line extending along the axial direction) between the flared portion 111 and the equidistant portion 112, so that the insulating paper 2 can always be attached to the side wall of the conductor slot 1h. Further, in a cross section orthogonal to a central axis of the iron core body taken along the radial direction, a contour line of the flared portion 111 and a contour line of the equidistant portion 112 both extend linearly, and an angle of an obtuse angle formed by the contour line of the flared portion 111 and the contour line of the equidistant portion 112 may be, for example, 170 degrees. In this way, performance of the iron core 1 will not be adversely affected even if the flared portion 111 is formed.

In addition, an end of the iron core tooth 11 at the radial opening of the conductor slot 1h has a slot wedge portion 113 protruding towards the inside of the conductor slot 1h, and the slot wedge portion 113 is adjacent to the flared portion 111. Faces of the slot wedge portions 113 adjacent to the flared portions 111 approach each other while extending obliquely towards the radially inner side, and the end of the insulating paper 2 extends to the face of the slot wedge portion 113 adjacent to the flared portion 111, so that the slot wedge portion 113 not only has a function of clamping a slot wedge (not shown), but also can be used to act to stop the end of the insulating paper 2.

In this embodiment, the insulating paper 2 is accommodated in the conductor slot 1h in a manner of attaching to a peripheral wall of the conductor slot 1h and a radially inner end of the insulating paper 2 is disposed at the flared portion 111. It should be understood that in part of the drawings, or in part of positions of the drawings, in order to clearly distinguish the insulating paper 2 from a slot wall of the conductor slot 1h, the insulating paper 2 is not tightly attached to the slot wall of the conductor slot 1h and in the present application, it is expected that the insulating paper 2 is attached to the slot wall of the conductor slot 1h. Moreover, due to manufacturing or assembly errors, etc., in some areas, the insulating paper 2 may not be tightly attached to the slot wall of the conductor slot 1h, and such errors will not deviate from the gist of the present disclosure, which should still be considered within the scope of the present application.

In this embodiment, the conductor 3 is a wave winding. A plurality of conductors 3 are inserted into each conductor slot 1h, and the plurality of conductors 3 may be arranged in a radial direction in the same conductor slot 1h.

An assembly method for the stator assembly for use in a motor according to an embodiment of the present disclosure will be described below with reference to the accompanying drawings of the specification.

(Assembly Method for the Stator Assembly)

Figure 2A:
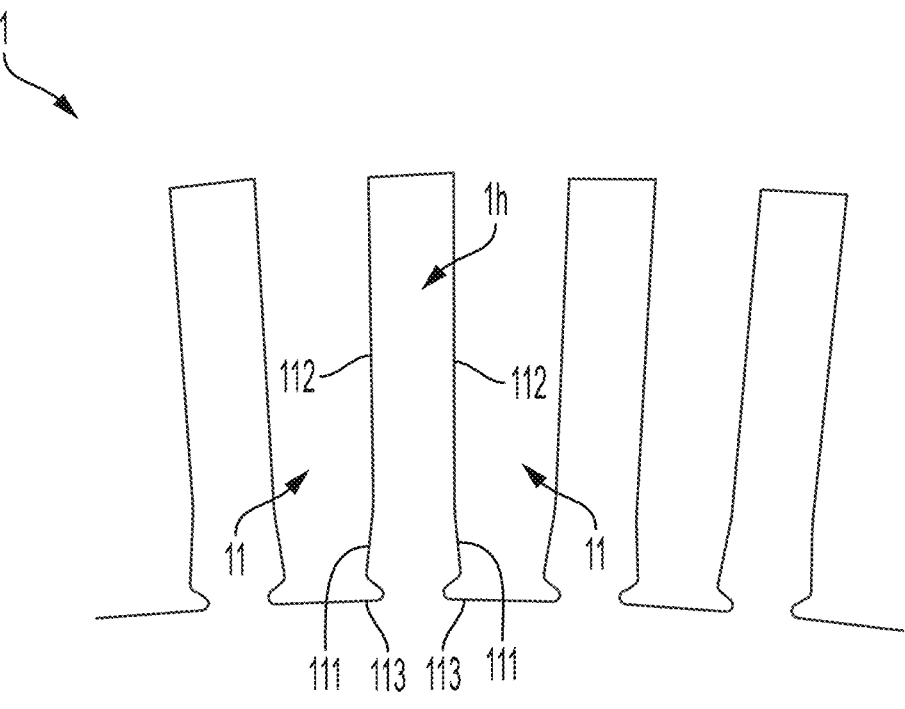
FIG. 2A is a schematic diagram showing a partial structure of an iron core of the stator assembly for use in a motor according to an embodiment of the present disclosure.
Figure 2B:
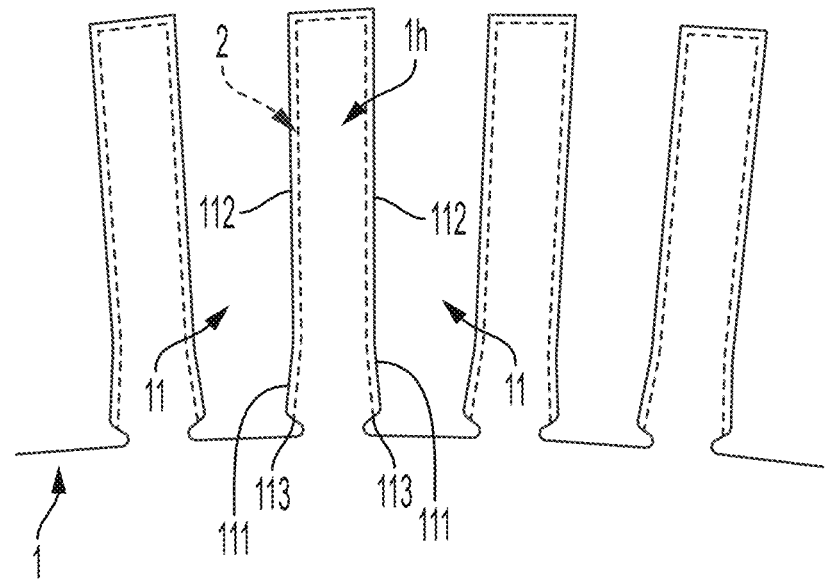
FIG. 2B is a schematic diagram showing a state after the insulating paper is installed in the conductor slot of the iron core in FIG. 2A.
Figure 2C:
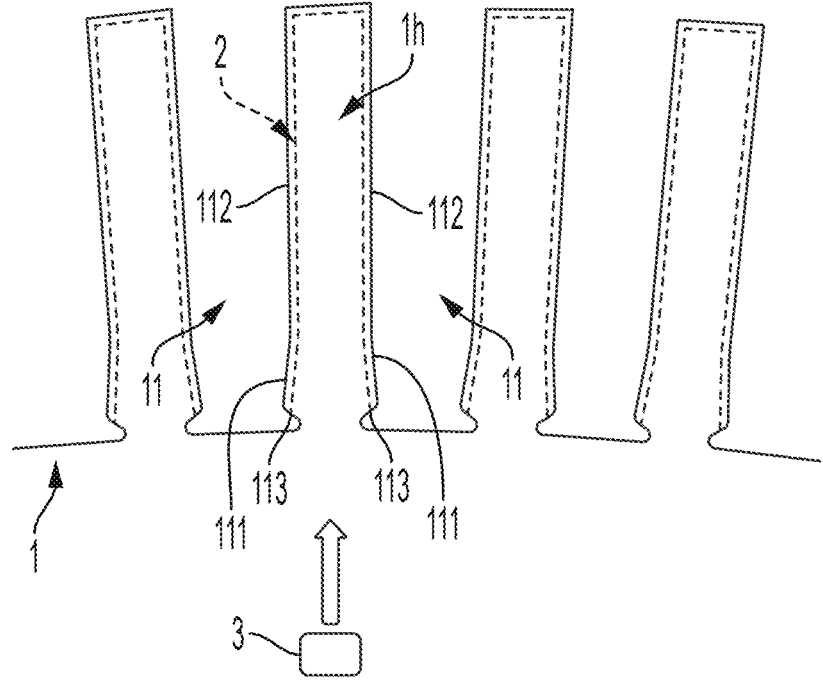
FIGS. 2C to 2E are schematic diagrams showing a process of inserting the conductor into the conductor slot installed with the insulating paper in FIG. 2B, wherein the conductor is inserted into the conductor slot along the direction of the arrow.
Figure 2D:
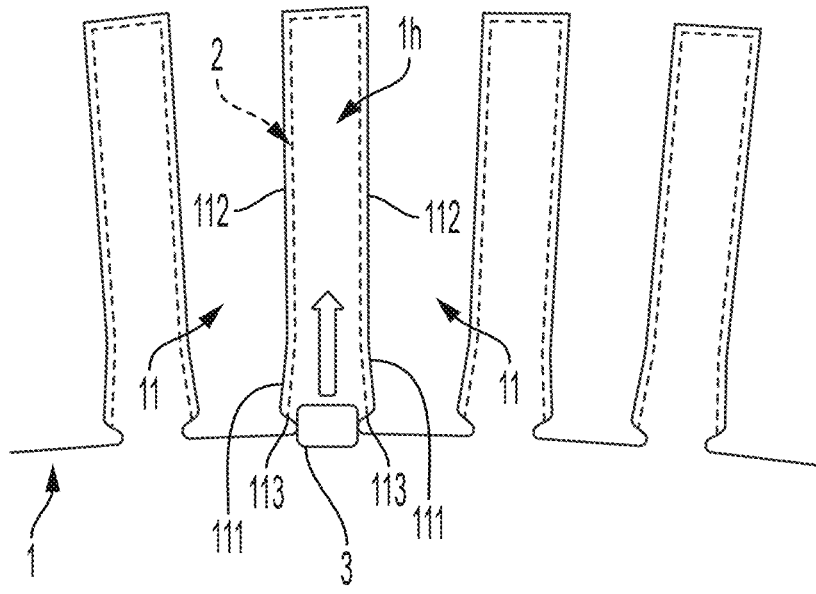
Figure 2E:
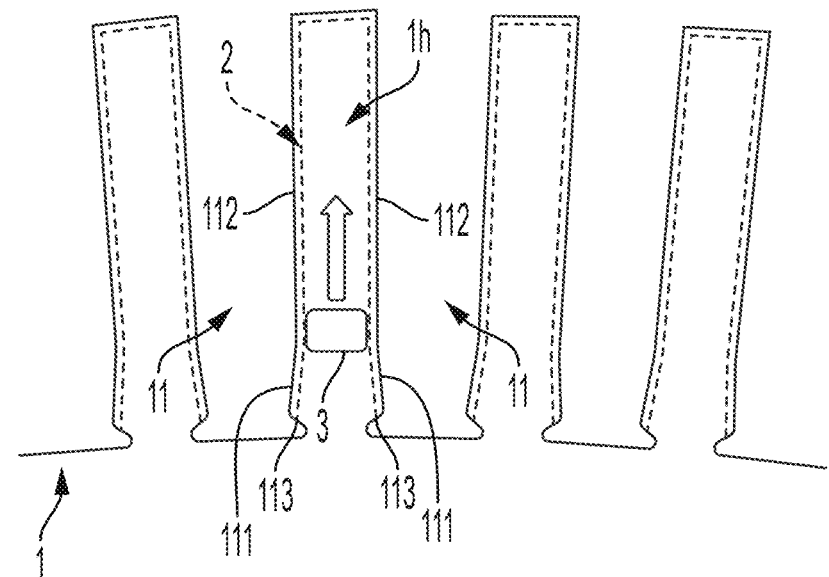

Specifically, the assembly method for the stator assembly for use in a motor according to an embodiment of the present disclosure comprises the following steps: as shown in FIGS. 2A and 2B, putting the insulating paper 2 into the conductor slot 1h, wherein the insulating paper 2 is bent at an interface of the flared portion 111 and the equidistant portion 112 of the side wall of the conductor slot 1h, the insulating paper 2 is attached to the peripheral wall of the conductor slot 1h and the end of the insulating paper 2 is disposed at the flared portion 111; and as shown in FIGS. 2C to 2E, inserting the conductor 3 into the conductor slot 1h along the radial direction.

During insertion of the conductor 3 into the conductor slot 1h, FIG. 2C shows a state that the conductor 3 is prepared to be inserted into the conductor slot 1h, wherein the conductor 3 is prepared to be inserted into the conductor slot 1h along the direction indicated by the arrow. FIG. 2D shows a state that the conductor 3 reaches the radial opening of the conductor slot 1h. As can be seen clearly from this figure, because the side wall of the conductor slot 1h of the present disclosure is formed with the structure of the flared portion 111, the insulating paper 2 is also attached to the side wall of the conductor slot 1h accordingly and the end of the insulating paper 2 is disposed at the flared portion 111, so that the conductor 3 will not interfere with the insulating paper 2 undesirably when entering the radial opening of the conductor slot 1h, as shown in FIG. 2D. FIG. 2E shows that the conductor 4 has passed through the flared portion 111 of the conductor slot 1h basically smoothly, and is about to be inserted into the equidistant portion 112 of the conductor slot 1h. In this way, since the conductor 3 is already far away from the end of the insulating paper 2, even if the space of the conductor slot 1h at the equidistant portion 112 becomes smaller which may cause the insulating paper 2 to contact with the conductor 3, the insulating paper 2 will not be undesirably curled.

Further, the present disclosure also provides a motor, which includes the stator assembly for use in a motor with the above structure, and the motor can also adopt the above-mentioned assembly method for the stator assembly for use in a motor.

Naturally, the present disclosure is not limited to the above-mentioned embodiments, and a person skilled in the art could make various modifications to the above-mentioned embodiments of the present disclosure guided by the present disclosure without departing from the scope of the present disclosure. In addition, illustration is made as follows.

(i) It should be noted that the insulating paper 2 attaching to the peripheral wall of the conductor slot 1h described in the present disclosure means that the insulating paper 2 can be tightly attached to the peripheral wall of the conductor slot 1h in a non-adhesive manner (including side walls located at both sides in the circumferential direction and a top wall located at a radially outer side). In this case, the insulating paper 2 can be tightly attached to the peripheral wall of the conductor slot 1h by its own tension.

For example, before the insulating paper 2 is inserted into the conductor slot 1h, a distance between opposite ends near the opening of the insulating paper 2 is slightly greater than the width of corresponding positions of the flared portions 111 of the conductor slot 1h (approximately along the circumferential direction of the iron core). After the insulating paper 2 is inserted into the conductor slot 1h, the opposite ends near the opening of the insulating paper 2 are slightly compressed to be well attached to the flared portion 111.

(ii) As illustrated in the above specific embodiments, in order to make the insulating paper 2 better attach to the side wall of the conductor slot 1h, the insulating paper 2 forms a bent shape at the junction of the flared portion 111 and the equidistant portion 112; specifically, the bent position of the bent shape corresponds to a boundary line of the flared portion 111 and the equidistant portion 112. In the above specific embodiments, since the boundary line between the flared portion 111 and the equidistant portion 112 is formed in a non-smooth transition shape, corresponding bending of the insulating paper 2 can be implemented easily.

Further, although it has been illustrated in the above specific embodiments that there is a non-smooth transition at the junction of the flared portion 111 and the equidistant portion 112, the present disclosure is not limited thereto. The junction can be designed as a smooth transition, and the insulating paper 2 can curve correspondingly at the junction, which will not affect implementation effect of the present disclosure.

(iii) As illustrated in the above specific embodiments, the obtuse angle formed between the contour line of the flared portion 111 and the contour line of the equidistant portion 112 in the cross section is 170 degrees, so as to ensure performance of the iron core 1. Tests have shown that the performance of the iron core 1 will not be adversely affected if the obtuse angle formed between the contour line of the flared portion 111 and the contour line of the equidistant portion 112 in the cross section is not smaller than 150 degrees.

Further, although it is illustrated in the specific embodiments of the present disclosure that the contour line of the flared portion 111 in the cross section is a straight line, it can also be implemented as a curve, which does not affect the implementation effect of the present disclosure.

(iv) Although it has been illustrated in the above specific embodiments that the insulating paper 2 is used as the sheet-like insulator, the present disclosure is not limited thereto, and other sheet-like insulators capable of achieving the same or similar functions may be used. For example, sheet-like insulating resin may be used as the sheet-like insulator.

(v) Although it is not clearly illustrated in the above specific embodiments, it can be understood that the stator assembly for use in a motor according to the present disclosure also includes a slot wedge formed of an insulating material, and the slot wedge can be inserted into the conductor slot along the axial direction and clamped to the slot wedge portion, thereby preventing the conductor 3 from coming out of the conductor slot 1h.

(vi) Although it has been illustrated in the above specific embodiments that the conductor slot 1h has a radial opening that opens towards the radially inner side, the present disclosure is not limited thereto. The conductor slot 1h need not be formed with the radial opening that opens towards the radially inner side, but may instead be formed with a radial opening that opens towards the radially outer side; in other words, the conductor slot is not formed at the inner peripheral portion of the iron core, but at the outer peripheral portion of the iron core.

DESCRIPTION OF REFERENCE NUMERALS

10 Iron core
10h Conductor slot
20 Insulating paper
30 Conductor
1 Iron core
1h Conductor slot
11 Iron core tooth
111 Flared portion
112 Equidistant portion
113 Slot wedge portion
2 Insulating paper
3 Conductor

The invention claimed is:

1. A stator assembly for a motor, comprising: an iron core, wherein the iron core includes a cylindrical iron core body and a plurality of iron core teeth, the plurality of iron core teeth protruding from the iron core body along a radial direction of the iron core body and being arranged along a circumferential direction of the iron core body, conductor slots for accommodating conductors being formed between every two iron core teeth adjacent in the circumferential direction, side walls of the conductor slots formed by the iron core teeth having flared portions, and the flared portions being opposite each other in the circumferential direction and diverging from each other as the flared portions extend towards radial openings of the conductor slots; and sheet-like insulators, wherein the sheet-like insulators are accommodated in the conductor slots in a manner of attaching to peripheral walls of the conductor slots, and ends of the sheet-like insulators are disposed at the flared portions, wherein in a cross section orthogonal to a central axis of the iron core body taken along the radial direction, a contour line of the flared portion extends linearly or curvilinearly, wherein the side walls further comprise equidistant portions adjacent to the flared portions, the equidistant portions being opposite to each other in the circumferential direction and a spacing in the circumferential direction between the equidistant portions being always equal in the radial direction, and wherein the sheet-like insulators curve at an interface of the flared portion and the equidistant portion of the side wall of the conductor slots.

2. The stator assembly according to claim 1, wherein in the cross section orthogonal to the central axis of the iron core body taken along the radial direction, an angle of an obtuse angle formed by the contour line of the flared portion and a contour line of the equidistant portion is not less than 150 degrees.

3. The stator assembly according to claim 1, wherein there is a non-smooth transition or a smooth transition between the flared portion and the equidistant portion.

4. The stator assembly according to claim 1, wherein an end of the iron core tooth at the radial opening of the conductor slot has a slot wedge portion protruding towards the inside of the conductor slot, and the slot wedge portion is adjacent to the flared portion.

5. The stator assembly according to claim 4, wherein the ends of the sheet-like insulators extend to a face of the slot wedge portion adjacent to the flared portion.

6. The stator assembly according claim 1, wherein the stator assembly includes conductors, and a plurality of conductors are respectively accommodated and installed in each conductor slot formed by the iron core.

7. The stator assembly according to claim 6, wherein the conductor is a wave winding.

8. An assembly method for a stator assembly for use in a motor, the assembly method comprising the following steps:

providing a stator comprising an iron core, wherein the iron core includes a cylindrical iron core body and a plurality of iron core teeth, the plurality of iron core teeth protruding from the iron core body along a radial direction of the iron core body and being arranged along a circumferential direction of the iron core body, conductor slots for accommodating conductors being formed between every two iron core teeth adjacent in the circumferential direction, side walls of the conductor slots formed by the iron core teeth having flared portions, and the flared portions being opposite each other in the circumferential direction and diverging from each other as the flared portions extend towards radial openings of the conductor slots, wherein in a cross section orthogonal to a central axis of the iron core body taken along the radial direction, a contour line of the flared portion extends linearly or curvilinearly, wherein the side walls further comprise equidistant portions adjacent to the flared portions, the equidistant portions being opposite to each other in the circumferential direction and a spacing in the circumferential direction between the equidistant portions being always equal in the radial direction; and putting a sheet-like insulator into the conductor slot, wherein the sheet-like insulator curves at an interface of the flared portion and the equidistant portion of the side wall of the conductor slot, the sheet-like insulator is attached to the peripheral wall of the conductor slot, and an end of the sheet-like insulator is disposed at the flared portion; and inserting the conductor into the conductor slot along the radial direction.

9. A motor, comprising a stator assembly having an iron core, wherein the iron core includes a cylindrical iron core body and a plurality of iron core teeth, the plurality of iron core teeth protruding from the iron core body along a radial direction of the iron core body and being arranged along a circumferential direction of the iron core body, conductor slots for accommodating conductors being formed between every two iron core teeth adjacent in the circumferential direction, side walls of the conductor slots formed by the iron core teeth having flared portions, and the flared portions being opposite each other in the circumferential direction and diverging from each other as the flared portions extend towards radial openings of the conductor slots; and sheet-like insulators, wherein the sheet-like insulators are accommodated in the conductor slots in a manner of attaching to peripheral walls of the conductor slots, and ends of the sheet-like insulators are disposed at the flared portions, wherein in a cross section orthogonal to a central axis of the iron core body taken along the radial direction, a contour line of the flared portion extends linearly or curvilinearly, wherein the side walls further comprise equidistant portions adjacent to the flared portions, the equidistant portions being opposite to each other in the circumferential direction and a spacing in the circumferential direction between the equidistant portions being always equal in the radial direction, and wherein the sheet-like insulators curve at an interface of the flared portion and the equidistant portion of the side wall of the conductor slots.

10. The motor according to claim 9, wherein in the cross section orthogonal to the central axis of the iron core body taken along the radial direction, an angle of an obtuse angle formed by the contour line of the flared portion and a contour line of the equidistant portion is not less than 150 degrees.

11. The motor according to claim 9, wherein there is a non-smooth transition or a smooth transition between the flared portion and the equidistant portion.

12. The motor according to claim 9, wherein an end of the iron core tooth at the radial opening of the conductor slot has a slot wedge portion protruding towards the inside of the conductor slot, and the slot wedge portion is adjacent to the flared portion.

13. The motor according to claim 12, wherein the ends of the sheet-like insulators extend to a face of the slot wedge portion adjacent to the flared portion.

14. The motor according to claim 9, wherein the stator assembly includes conductors, and a plurality of conductors are respectively accommodated and installed in each conductor slot formed by the iron core.

15. The motor according to claim 14, wherein the conductor is a wave winding.

* * * * *